(12) United States Patent
Sönsteröd

(10) Patent No.: US 8,136,644 B2
(45) Date of Patent: Mar. 20, 2012

(54) ARRANGEMENT, DEVICE AND METHOD AT A DISTURBANCE-ELIMINATING VALVE FOR DAMPER

(75) Inventor: Lars Sönsteröd, Sandared (SE)

(73) Assignee: Ohlins Racing AB, Upplands Vasby (SE)

( * ) Notice: Subject to any disclaimer, the term of this patent is extended or adjusted under 35 U.S.C. 154(b) by 819 days.

(21) Appl. No.: 11/916,810

(22) PCT Filed: Jun. 14, 2006

(86) PCT No.: PCT/SE2006/000701
§ 371 (c)(1),
(2), (4) Date: Sep. 5, 2008

(87) PCT Pub. No.: WO2006/135319
PCT Pub. Date: Dec. 21, 2006

(65) Prior Publication Data
US 2009/0200125 A1    Aug. 13, 2009

(30) Foreign Application Priority Data
Jun. 14, 2005   (SE) ........................................ 0501345

(51) Int. Cl.
*F16F 9/34*    (2006.01)

(52) U.S. Cl. ............... 188/266.4; 188/266.5; 188/266.6; 188/275; 188/282.5; 188/285; 188/313; 91/459; 251/325

(58) Field of Classification Search ............... 188/266.1, 188/266.4, 266.5, 266.6, 322.2, 322.13–322.14, 188/322.17–322.19; 251/325
See application file for complete search history.

(56) References Cited

U.S. PATENT DOCUMENTS

| 4,997,068 A | * | 3/1991 | Ashiba .................. 188/282.5 |
| 5,332,068 A | * | 7/1994 | Richardson et al. ........ 188/275 |

FOREIGN PATENT DOCUMENTS

| EP | 0608427 A1 | 8/1994 |
| SE | 526397 | 9/2005 |

OTHER PUBLICATIONS

International Search Report for International Application No. PCT/SE2006/000701, dated Oct. 3, 2006.

* cited by examiner

*Primary Examiner* — Robert A Siconolfi
*Assistant Examiner* — San Aung
(74) *Attorney, Agent, or Firm* — Knobbe Martens Olson & Bear, LLP

(57) ABSTRACT

An electronically-controlled damper arrangement includes a valve assembly. The valve assembly features a valve slide that carries at least two pistons. The first piston controls flow through two separate flow paths while the second piston controls damping provided by the valve slide. The first piston being both axially moveable and radially moveable within a valve housing.

18 Claims, 6 Drawing Sheets

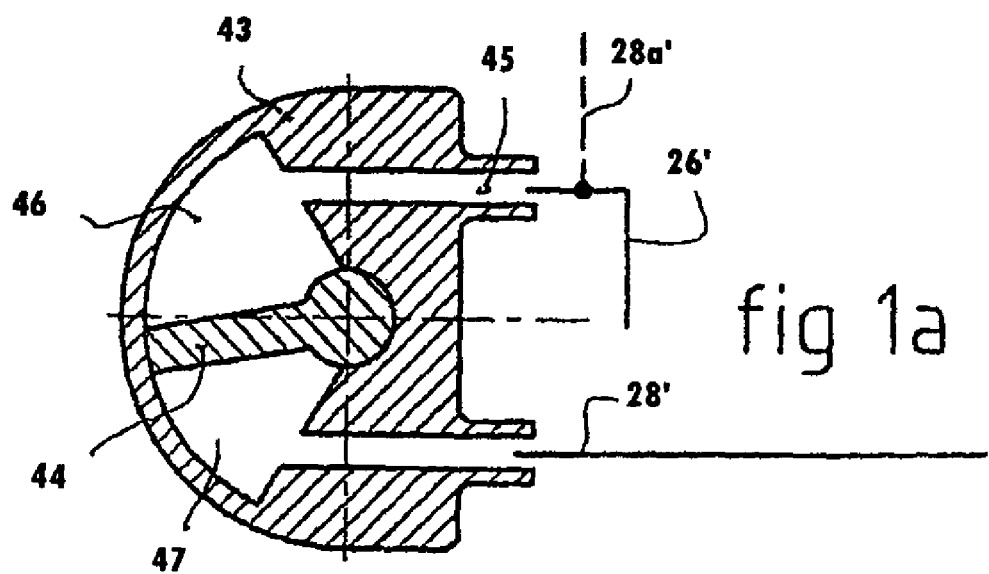

ARRANGEMENT, DEVICE AND METHOD AT A DISTURBANCE-ELIMINATING VALVE FOR DAMPER

CROSS-REFERENCE TO RELATED APPLICATION

This application claims the benefit and priority to and is a U.S. National Phase of PCT International Application Number PCT/SE2006/000701, filed on Jun. 14, 2006, designating the United States of America and published in the English language, which claims priority under 35 U.S.C. §119 to Swedish Application Number 0501345-3, filed on Jun. 14, 2005. The disclosures of the above-referenced applications are hereby expressly incorporated by reference in their entireties.

BACKGROUND OF THE INVENTION

1. Field of the Invention

The present invention generally relates to damping arrangements, such as dampers used in shock absorbers or steering assemblies, used in motor vehicle applications. More particularly, the present invention relates to a valve assembly used with such dampers that operates to remove undesired oscillations during use caused by an admixture of air and damper medium.

2. Description of the Related Art

The technology that has been used to date within the field is described in, for example, S9800775-0, S0400012-1, EP504624-A2 and EP400395-B1. The valves in question are described in these documents as pilot-controlled, with damping of the pilot cone not being described in certain cases, but with a solenoid's armature being damped in its cylinder. In other cases, as in EP400395, the damping is described as a throttling between two chambers. Among other things, it is common to the known technical solutions that the damping arrangement is located on the low pressure side, which is downstream of the valve function that is to be damped.

The problem with the valves in these references is that their damping is based on the sum of hydraulic damping in the solenoid or in its vicinity, and friction. The shock absorbers or steering dampers, etc, that are used within the car industry do not usually have so-called gas-separating pistons, for which reason the hydraulic fluid becomes saturated with gas. After hard driving with such dampers, gas collects in pockets and closed spaces and the volume of gas increases the lower the pressure. This means that the damping that relates to valve functions on the low pressure side can be lost under the circumstances. Remaining friction is insufficient to damp the valve function, which can cause oscillations with frequencies within the range 400-1500 Hz. This sound is particularly irritating to the human ear and is not acceptable to car users and car manufacturers. Increased friction has been tested and has been found not to solve the problem in a correct way. Certain features, aspects and advantages of some embodiments of the present invention are intended to solve this problem, among others.

There is also a desire for the valve in question, for example a proportional valve, to be able to be incorporated in a main valve in an integrated and space-saving way.

Certain features, aspects and advantages of some embodiments of the present invention also solve this problem.

SUMMARY OF THE INVENTION

Certain features, aspects and advantages of some embodiments of the present invention relate, among other things, to an arrangement with disturbance elimination for electronically-controlled dampers for vehicles. The dampers can be used in, for example, shock absorbers, steering dampers, etc. The electronic control can be carried out by computer or an actuator for so-called EC-function. The vehicles can be wheeled vehicles with two, three, four or more wheels. The invention also can be used for snow-scooters with runners, tracks, etc.

The arrangement can have, among other things, control equipment that comprises movement-detecting sensors that detect the movements of wheels, runners, tracks, etc, and that send control signals to one or more dampers in response to these movements. Each damper preferably comprises a cylinder containing a piston or piston device that operates in a medium utilized by the damper (for example, hydraulic oil with any desired additives). The piston or piston device divides the inner chamber of the cylinder into a first chamber compartment and a second chamber compartment. The damper also comprises or interacts with one or more valve assemblies in the form of pilot valves or partial step valves that control the pressure of the medium in the first and second chamber compartments. Thus, the damping carried out by the respective damper, for example in both directions, can be controlled by the control signals issued from the controller. Each valve assembly preferably comprises at least one electrical coil that is connected, or that can be connected, to the control signals, and a part that is controlled by the coil when the control signals are received. The part is able to move and preferably works with short strokes. Through its movements, this part in turn affects a first piston that moves in a first space in, for example, a valve housing, against the action of a spring, which first piston divides the first space into a first and a second partial space. In a first functional state, the first piston assumes a longitudinally displaced position that causes a first flow of medium to pass from the damper's first chamber compartment, via the partial space below the first piston and on through a first side opening (port) arranged in the inner wall of the housing, to a first duct connected to the second chamber compartment of the damper. In a second functional state, the first piston assumes a longitudinally displaced position where a second flow of medium, unaffected by the first piston, passes from the first partial space to a second side opening (port) that is preferably to be found in the same housing and on to the second chamber compartment of the damper via a second duct and a non-return element arranged in the flow path. When the second functional state is assumed, the first piston is arranged to be caused to move, because of the guide faces arranged on the valve piston and because of the guide faces in the housing that correspond to these, to a position in front of the first side opening where the first flow of medium has been reduced and the second flow of medium is initiated due to an increase in pressure in the partial space caused by the reduction in the first flow of medium and, hence opening the non-return element.

In addition, the first piston assumes the position in front of the first side opening under the influence of the spring and a reduction in pressure at the first side opening caused by the piston assuming the position alongside the first side opening. The first piston is arranged with passages between the partial spaces, which passages provide axial pressure relief in both of the functional states.

Certain features, aspects and advantages of some embodiments of the present invention also relate to a device for dampers for vehicles that comprises or interacts with disturbance-eliminating valves in the form of partial step valves or pilot valves. The damper comprises a piston arranged in such a way that it can move in a cylinder or a blade that can rotate in a cylinder, which piston or blade divides the inner space in the cylinder, the valve housing, etc, into a first and a second chamber, with the chambers being connected together by one or more ducts via the valve. The valve has a valve slide and a valve piston that can move in spaces arranged in the valve housing. The movements of the valve slide can be determined by a force that can be completely or partially initiated from an external actuator or a computer, for example a microcomputer. The movements can also be determined by a force that is determined by pressure acting upon the areas of the valve piston that can be affected by the flow of the working medium between the first and second chambers and by a spring or spring function.

Certain features, aspects and advantages of some embodiments of the present invention also relate to a device for disturbance-eliminating valves in the form of partial step valves or pilot valves that comprise a valve slide that can move in a space in the medium, which valve slide is arranged to have an effect on a passage for the medium through the valve because of guides that exert a pressure force on the slide and a pilot spring force, called a first force, in the opposite direction to an actuating force, called a second force, applied on the valve slide, whereby the body divides the space into a damping chamber and a pilot pressure chamber by a part.

Certain features, aspects and advantages of some embodiments of the present invention also relate to a method for eliminating disturbances caused by the admixture of gas in a damping medium in a partial step valve or pilot valve arranged in a vehicle.

The valve described above is able to operate silently and is believed to be completely unaffected by gas that is saturated in the oil in shock absorbers. In addition, the main stage of the valve can be provided with a double spring function that makes it possible to carry out very accurately set and low preloading with small variations in spite of the selection of a stiff spring constant. The whole valve can be assembled in sequence from one direction.

In accordance with certain features, aspects and advantages of some embodiments of the present invention, in the case with two functional states, the transitions between the different states can take place without any specific actions or resetting having to be carried out, for example without the vehicle having to be stopped in order to carry out the transition. The arrangement and the device according to certain features, aspects and advantages of some embodiments of the present invention can work with or can comprise dampers that are arranged with damping function in one or both directions. The dampers can consist of shock absorbers or steering dampers for vehicles between parts of the vehicle that can move in relation to each other.

The principal characteristic of an arrangement according to certain features, aspects and advantages of some embodiments of the present invention is, among other things, that the first piston is located on a valve slide that can move in a longitudinal direction and that extends into the first space and into a second space in the housing that is connected to the first space. In addition, a control edge for the valve slide is located at a transition to the second space, while at the same time the part of the slide that extends into the second space has an extension part upstream of the control edge with a second piston arranged on the extension part. The second piston divides the second space into third and fourth partial spaces. These partial spaces divide the area of action of the valve slide into a first part in association with the seat or control edge and a second part on the underside of the second piston. In addition, certain features, aspects and advantages of some embodiments of the present invention are characterized in that the second piston and an opposing inner guide face in the second space are arranged with a clearance between them that eliminates disturbance by ensuring that the pressure differences that arise in the second space (i.e., the cavity) at the second piston as a result of the speed of movement of the slide affect the second part of the area of action of the slide with a force that counteracts the movement.

It is typical of certain features, aspects and advantages of some embodiments of the present invention that disturbance elimination also works when the partial space is filled with gas, due to the fact that, as early as during the pressure-increasing phase or pressure-reducing phase, a force arises that prevents movement, as the gas inside the partial space first is compressed before movement of the slide can take place.

The valve thus works with damping on the high pressure side, that is upstream, which helps to solve the problem discussed above.

The principal characteristic of a device according to certain features, aspects and advantages of some embodiments of the present invention is, among other things that, at the high pressure side, that is upstream of the valve piston that was described above, there is a damping device that damps the movements of the valve piston irrespective of the state of the working medium, that is irrespective of the gas content in the medium.

The device according to the invention can also be said to be characterized in that, in a stationary control position of the body, the pressure in the damping chamber is arranged to assume a value that essentially corresponds to a pressure value in the pilot pressure chamber, in that, in the event of an urged movement from the stationary control position, the body is arranged to bring about a pressure difference at the part and in that, in the event of the movement, the pressure in the damping chamber undergoes a change in value that is essentially proportional to the speed of movement of the body and generates a damping force that coincides with the control force and that counteracts the movement of the body and thereby brings about the disturbance elimination, that can consist of preventing any admixture of gas in the medium affecting damping caused by the valve or preventing unwanted noises arising due to the admixture of gas.

Depending upon which part of the damping process is being described, it is also possible to characterize certain features, aspects and advantages of some embodiments of the present invention in that the damping force coinciding with the control force arises as soon as it is the case that the damping chamber is filled with gas in a pressure-increasing or pressure-reducing procedure for the reason that, on account of its compressibility, the gas in question cannot have a pressure-increasing or pressure-reducing effect on the area of action of the slide that is in the damping chamber.

By what is proposed in the above, a control function with control edge/seat/etc and piston-part/membrane/etc can be arranged on or in association with the slide or corresponding moving device. The function of the spring can alternatively be provided by other devices that have a spring function. By stiff spring constant is meant values between 40-500 N/mm. The abovementioned problems are solved by the creation of a damping force that constitutes part of the first force and, at the same time, is on the high pressure side, upstream of the control edge, seat, etc.

The method according to certain features, aspects and advantages of some embodiments of the present invention means that, in a first activated functional state, a second piston, arranged on the high pressure side or upstream of a valve piston that moves in the damping medium, is inserted into a space in a cylinder and divides this cylinder into an additional damping chamber, while at the same time it causes a change in pressure in the additional damping chamber. In a second functional state, called the inactivated or deactivated state, the damping medium flows more freely over the second piston and equalizes the pressure across the piston. The change in pressure thus generates an additional damping force that counteracts the movement of the valve slide irrespective of the admixture of gas in the damping medium in the first functional state but, however, not as much as in the second functional state.

BRIEF DESCRIPTION OF THE DRAWINGS

A currently proposed arrangement, device and method for an embodiment of the invention will be described below with reference to the attached drawings, in which:

FIG. 1*a* schematically shows in horizontal section a blade damper that can be connected to the arrangement according to FIG. 1;

DETAILED DESCRIPTION OF THE PREFERRED EMBODIMENT

Figure 1:
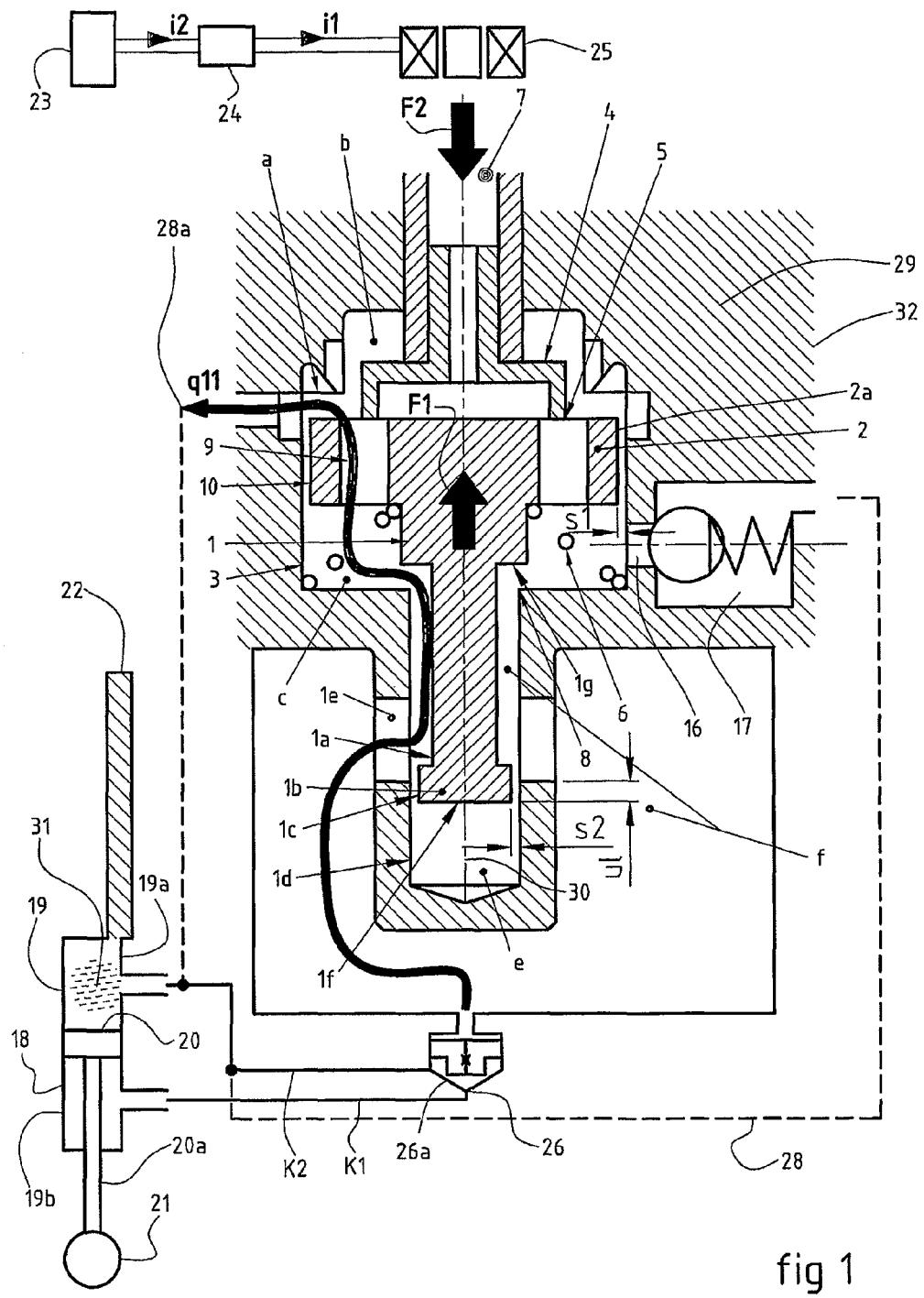
FIG. 1 schematically shows a vertical section of an arrangement with a damped proportional valve with two functional states arranged to interact with a shock absorber for a vehicle in the form of a car, with the valve assuming an activated first functional state.
Figure 2:
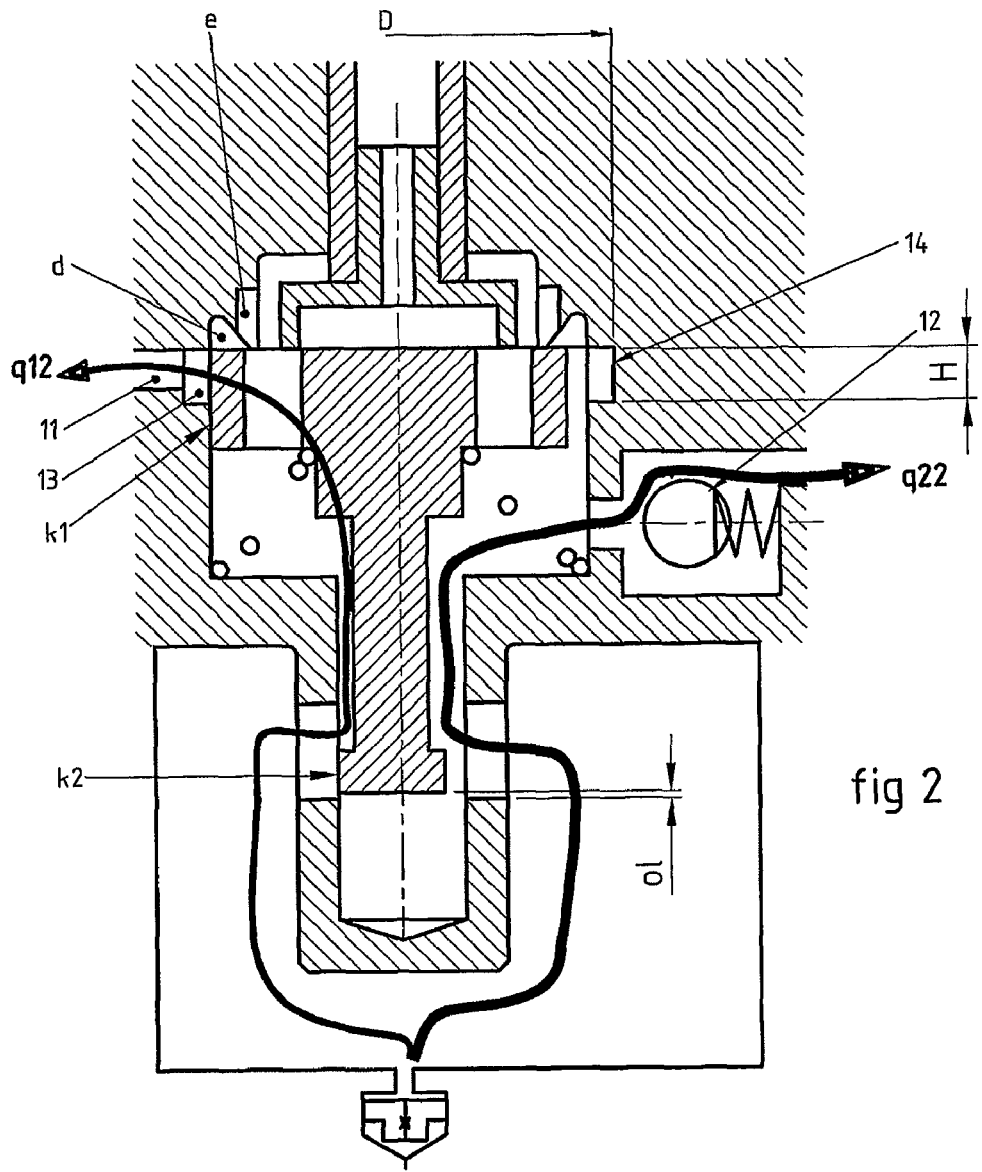
FIG. 2 schematically shows in vertical section the valve according to FIG. 1 in a second inactivated functional state.

FIG. 1 shows the arrangement/valve with an activated valve actuator and FIG. 2 shows the arrangement/faces towards the actuator provided with a disk-shaped first piston 2, which is guided against valve in deactivated state. A valve piston 1 is on a part that an inner wall 3 of the pilot housing and which makes contact in an axial direction with an actuator pin 4 in a plane 5 perpendicular to the direction of movement.

The valve piston 1 of the pilot valve is acted upon in one direction by a first force F1 from a spring 6 or a device exerting a biasing force and by forces that result from pressure exerted in the chambers e and f. The valve piston 1 also is acted upon in a second direction by a second force F2 from an actuator 7 in the activated state. The pilot cone is normally located several hundredths from a control edge 8.

In its extension, the valve piston 1 is provided with an extension part 1*a* and a second piston 1*b*. A guide face 10 of the second piston 1*b* preferably has a clearance s2 to an inner wall of a cylinder 1*d* that extends from the control edge 8. A communicating gap s2 is defined between the second piston 1*b* and the cylinder 1*d* and the second piston 1*b* divides the space into an additional two chambers: a damping chamber e and a pilot pressure chamber f. When the valve piston 1 is in the controlling position and is stationary, the pressure in the damping chamber e is the same as the pressure in the pilot pressure chamber f, whereby the first force F1 is the sum of the effect of the pilot pressure f on the areas (1*f* and 1*g*).

When the valve piston 1 moves or there is an increase/decrease in pressure, the pressure in the damping chamber e changes essentially in proportion to the speed of the movement or the increase/reduction in pressure of the pilot cone. Thus, the change creates a damping force that always works against the direction of movement (i.e., that counteracts the movement). In other words, a damping or damping function is obtained. If there is gas in the damping chamber e, this makes no difference, as the damping force is a part of the first force F1 and is located on the high pressure side, upstream of the control edge 8. The clearance s2 is arranged to have a narrow range and to have a size that is in proportion to the selected diameter of the second piston 1*b*, for example from s=0.03 mm to s=0.05 mm for a piston diameter of 2.8 mm. That is, the ratio between the size of the clearance s2 and the diameter of the piston 1*b* can be calculated as the quotient between s and dk and the ratio can thus vary between 0.010 and 0.018.

In the second functional state (i.e., the inactivated or deactivated state), which is shown in FIG. 2, the force of the spring 6 urges the pilot cone towards its opposite end position, which is determined by a surface a. A number of holes 9 pass through the first piston 2. The holes provide communication between both sides of the first piston (i.e., space b and space c), which gives axial pressure relief on the pilot cone 1 in all positions and load conditions.

In order to create additional control and pressure relief towards the surface a, in an embodiment, a surrounding chamber can have a number of holes or slots g that provide communication between the chamber b and any chamber defined between the piston 2 and the surface a, which additionally contributes to pressure relief when the disk rests against the surface a. When the actuator of the valve piston 1 is deactivated, the first piston 2 moves towards the surface a that defines its end position in the illustrated embodiment and, before it has reached this position, a peripheral guide face 10 of its disk starts to close the radially-located port 11 to the flow q11 that occurs when the actuator is activated. A smooth transition to the second functional state is carried out, which ultimately results in a connection of a permanently set non-return element 12. The transition is smooth as a result of the gradual reduction of flow q11 to q12 in the side opening or throttle 13 with the final partial flow q12 being in parallel with the second flow q22, a transition that is free of transients. The throttle is, for example, designed as a circular groove 14 from which the port 11 opens.

The return function from the second functional state to the first functional state takes place in a corresponding way, by a gradually reducing flow q22 to a gradually increasing flow q12, meaning that no special resetting function is used.

An advantage can be obtained as far as production technology is concerned. The normally-required burring operation on the sensitive guide face is not required in some embodiments of the present invention because the outlet port 11 is never fully closed. Thus, no burrs interfere with the control of the slide disk.

The diameter D and the height H of the groove determine the size of the throttle and hence of the partial flow q12. This should preferably be precise and should be able to be repeated. The contact between the plane 5 and the plane a enables, however, the disk 2 to move radially, which it does when the second functional state is achieved because the disk is forced radially towards its closed position during its axial movement towards the outlet port 11 within the framework of the clearances s1 and s2. The radial movement is extremely small or equal to the gap in question.

FIG. 1 also shows a second side opening 16 to a duct or space 17 provided with the non-return element 12. The ducts 11 and 17 each lead to a chamber compartment in a shock absorber 18. The chamber compartments above and below the piston 20 have the reference numerals 19a and 19b. The shock absorber can be arranged for a vehicle wheel 21, for example via a piston rod 20a. The cylinder 19 can be connected to the chassis 22 of the vehicle.

One or more sensors 23 can be arranged on the wheel to detect and indicate the movements of the wheel relative to the chassis. A controller or computer device 24 or other computer function (i.e., a component functioning like a computer or controller) communicates with the sensor or sensors associated with one or more shock absorbers. The controller sends control signals 1i to one or more coils on one or more solenoids or corresponding electronic units. The control signals i1 bring about the forces F2 on the actuator pin or control device 4 of the solenoid part and hence the valve piston 1 in the valve. The detection signals from the sensor are given the reference numeral i2.

The duct between the valve 26a and the chamber compartment 19 is indicated by K2 and the duct between the space 17 and the first chamber compartment is shown by a broken line 28. When there is a complete or partial cessation or loss of the signals, the first piston 2 and the valve piston 1 assume the position shown in FIGS. 2 and 3 under the influence of the spring 6 and a reduction in pressure that occurs across the opening 11, 13 when the second functional state is assumed. Thus, the arrangement defaults to the inactive state.

The reduction in pressure 27 creates flow conditions that attempt to pull the first piston in a radial direction towards the opening 11, 13, as shown in FIG. 2. It has been found that the position can be repeated and that the piston assumes precisely or essentially the same position upon each assumption of the second functional state.

This is possible without inclining the disk-shaped first piston 2 if the clearances s1 and s2 are made as equal to each other as possible or essentially the same size. The present construction differs from Swedish Patent No. S0400012-1 in that the parts comprised in the pilot slide are guided at the points k1 and k2, which are located a relatively large distance apart, for example approximately 8 mm, and in that the clearance between the first piston 2 and the inner wall 3 of the housing is made significantly smaller on account of the desired relationship between s1 and s2. The damping that is achieved by the piston 1b can be eliminated, as it is not needed in the second functional state, by selecting a small value, for example approximately 0.1 mm, for the underlap/overlap ul in this position, as shown in FIG. 2. FIG. 1 shows how the damping is activated by using a relatively large value, for example approximately 1 mm, for the overlap ol. Thus, where there is a relatively large overlap between the piston 1b and the opening 1e, damping can occur with the piston 1b while, where there is a relatively small overlap or even an underlap, damping does not occur with the piston 1b.

Figure 3:
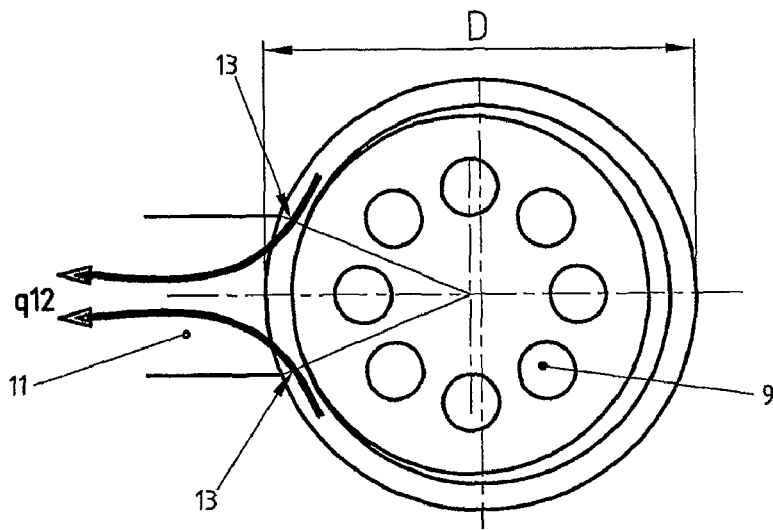
FIG. 3 shows in plan view the position function for the valve piston alongside a first side opening for a first flow of medium in the arrangement according to FIGS. 1-2.

FIG. 3 shows that the area in the throttle 13 is $A1=H*(Ds/2-Dd/2)*2$ where Ds=the diameter of the circular groove 14, H=the height of the circular groove and Dd=the diameter of the first piston 2. Ds, Dd and H are preferably selected around 9.8, 10.1 and 0.6 mm. The valve piston 1 preferably is constructed so that the surfaces 5, 8 and a are flat and perpendicular (i.e., radially directed) to the direction of movement (i.e., axially directed). The first piston 2 can always assume an unambiguous, well-defined and particular position on account of the clearance s2 that preferably is the same size as the clearance s1 in order to allow a narrow range of the partial flow q12, which thereby constitutes an accurately determined leakage flow determined by, for example, the diameter Ds.

Figure 5:
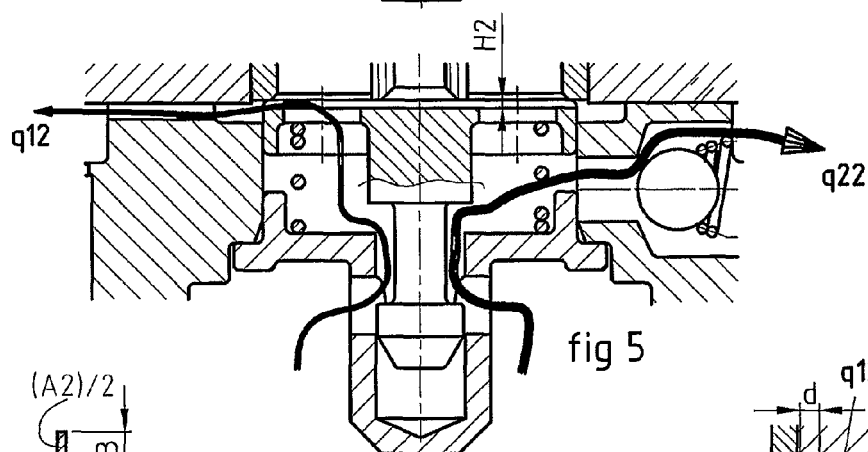
FIG. 5 shows in vertical section an embodiment of the valve with slots in the second functional state.
Figure 6B:
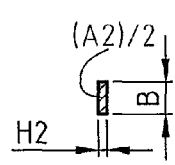
FIG. 6*b* vertical section that defines the area A2.
Figure 6:
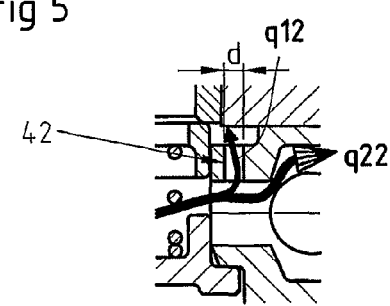
FIG. 6 shows in vertical section an embodiment of the valve with holes in the second functional state.

In the second functional state, which is shown in FIGS. 5 and 6b, the partial flow q12 can also be accurately determined by the breadth B and height H2 of the groove 42 by the area $A2=H2*B*2$ or, as in FIGS. 6 and 6b, by the hole 43 with the hole area $A3=\pi/4*d^2$. In both these cases, Ds is so large that no reduction in pressure arises in this zone. The measurements Ds, B and H are preferably selected around 12.8, 0.2 and 0.5 mm respectively.

Figure 4:
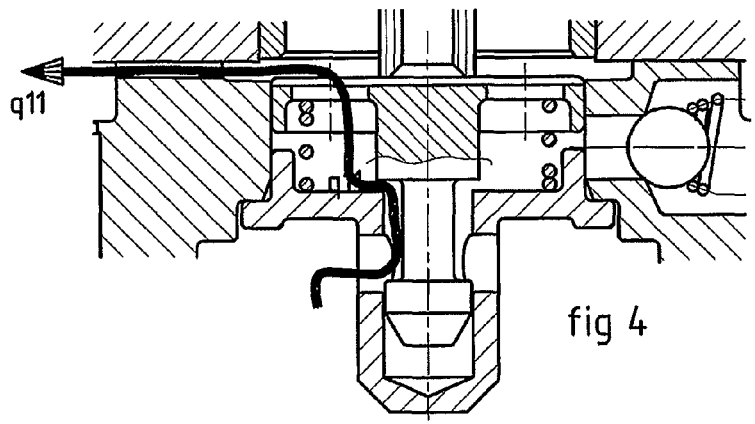
FIG. 4 shows in vertical section an embodiment of the valve with slots in the first functional state.

The first functional state is shown in FIG. 4, showing the normal functional principle with its first flow q11.

Figure 7:
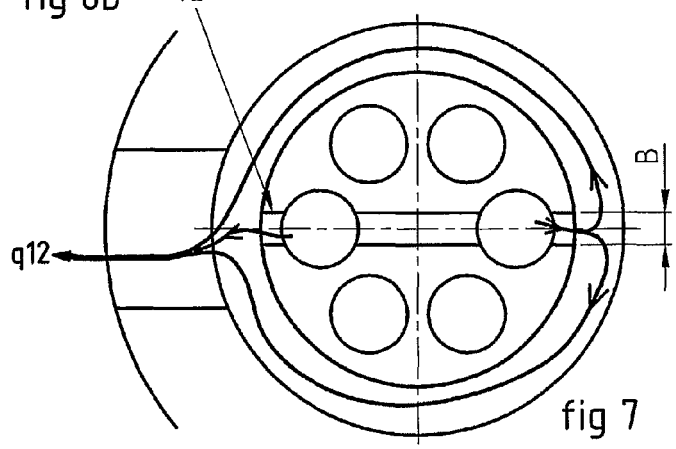
FIG. 7 shows in horizontal section an embodiment of the valve with slots in the second functional state.
Figure 6A:
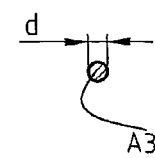
FIG. 6*a* horizontal section that defines the area A3.

FIGS. 5, 6 and 7 show the second functional state, showing the functional principle with a first partial flow q12 and a second partial flow q22.

Figure 8:
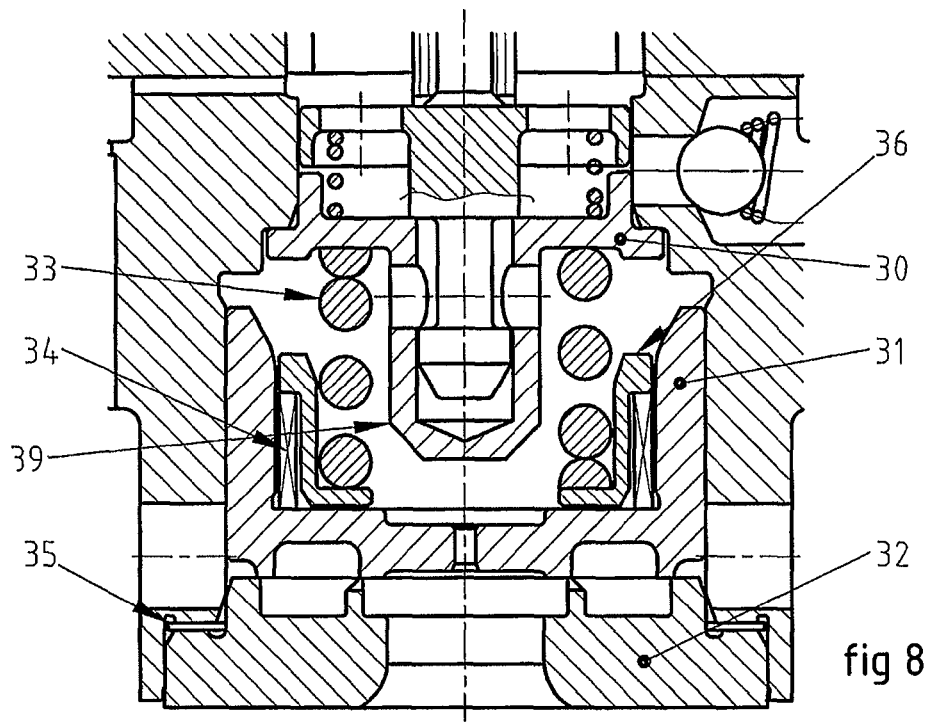
FIG. 8 shows in vertical section how the pilot valve is integrated with the main valve in a dual spring configuration with a spring holder.

FIG. 8 shows an example of a production embodiment, with the valve in its entirety, which unit can be assembled from one direction, because the pilot housing 30 constitutes a separate component that can be assembled from the same direction as a main cone 31 and a main seat 32. An innovation as far as functional technology is concerned is that the main cone of the valve has been provided with two springs connected in series, "dual springs", one stiff spring 33 and one weak spring 34 adjusted so that the pre-stressing of the main cone is low and precisely determined by the weak spring, preferably selected around F0.5±0.4 N. The desired stiffness is in a range between K1=40-500 N/mm for the main function that is determined by the stiff spring. The weak spring, with a spring constant preferably around K2=1 N/mm, is preferably selected to work with an extremely short stroke, preferably around x=0.035 mm with small permitted variation ±0.03 mm, which in turn is achieved by a suitable choice of shims 35. In the case shown, the springs are guided and held by a spring holder 36.

Figure 9:
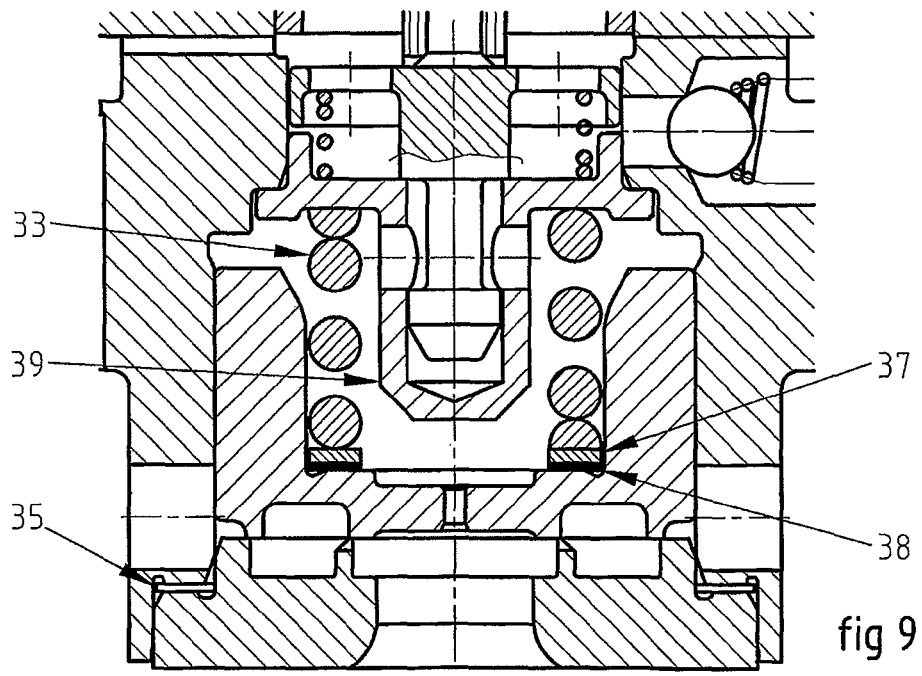
FIG. 9 shows in vertical section how the pilot valve is integrated with the main valve in a dual spring configuration with shim spring.

FIG. 9 shows the described functions implemented by a flat thin spacer 37 with a thickness t of preferably approximately 0.4 mm and a thin shim spring 38 with a thickness t of preferably approximately 0.1 mm. This construction is only one example, and the components 37 and 38 can be designed as a single shim spring connected in series with the main spring.

Both FIG. 8 and FIG. 9 show that the pilot function 39 has an integrated position inside the main spring 33 in the center, which means that the total valve concept can be made compact.

Figure 10:
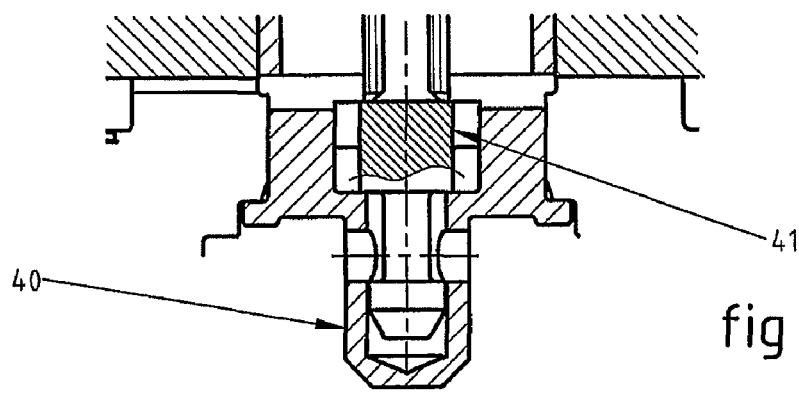
FIGS. 10-12 show in vertical section a number of simplified variants of pilot valves with only one functional state.
Figure 11:
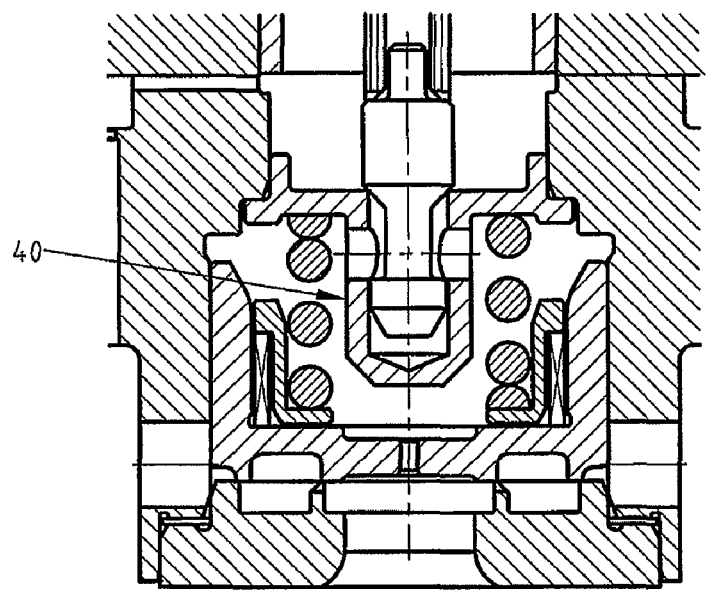
Figure 12:
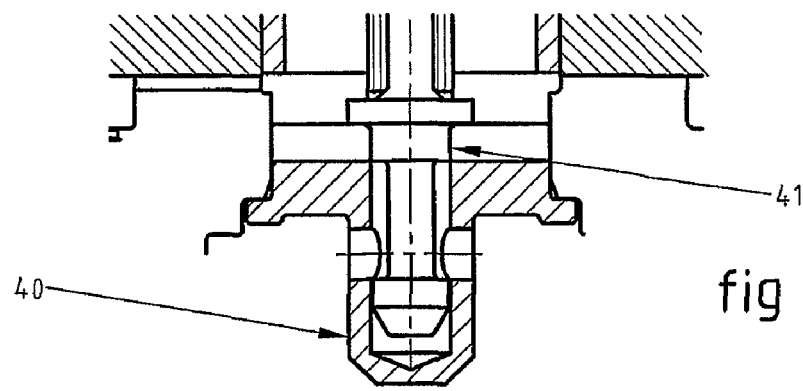

FIGS. 10, 11 and 12 show three embodiments of the pilot valve 40 that is described above, utilizing a valve piston 1 without a deactivated state 41. Simplified embodiments are possible, and accordingly the deactivated state can be removed in the described pilot valve design.

In FIG. 1a, the damper, for example the shock absorber, with a cylinder and a piston, has been replaced by a damper, for example a steering damper, in the form of a blade damper with housing 43 and blade 44. The housing is designed with ducts 45 that make it possible to connect the connections 26', 28' and 28a' to the first and second chamber compartments 46, 47 of the damper.

A method is provided for eliminating disturbances caused by the admixture of gas in a damping medium in a partial step valve or pilot valve arranged in a vehicle, where the valve comprises a valve slide that can move in a space (b, c, f) in the medium, arranged in ducts (K1, K2) between a first (19*a*) and a second (19*b*) chamber filled with damping medium. The valve is constructed of a valve piston (1), an extension part (1*a*), a second piston (1*b*) and a first piston (2). The method according to the invention means that, in a first activated functional state, the second piston (1*b*) that is arranged on the high pressure side or upstream of the valve piston (1) is inserted into a space in a cylinder (1*d*) and divides this cylinder (1*d*) into an additional damping chamber (e), while at the same time it causes a change in pressure in the additional damping chamber (e). In a second functional state, called the inactivated state, the damping medium flows more freely over the second piston (1*b*) and equalizes the pressure across the piston (1*b*).

The method thus affects the flow of working medium over the second piston (1*b*) and brings about an additional damping force applied on the slide which coincides with a first force (F1) determined by pressure acting on areas (1*f*, 1*g*) of the valve slide. The first force (F1) is opposed to a second force (F2) which can be completely or partially initiated by an external controllable actuator (7) or a computer function. The extension part (1*a*) and the second piston (1*b*) work in a fourth partial space (f) on the high pressure side, that is upstream, of the valve piston (1) so that the second piston (1*b*) divides the cylinder (1*d*) into the damping chamber (e) that is separated from the fourth partial space (f).

In its first functional state, the second piston (1*b*) is also arranged with a clearance (s2) and an overlap (ol) in the cylinder (1*d*) so that, in a stationary control position for the valve slide, the damping medium is allowed to flow via the overlap (ol) through this clearance (s2) in such a way that the pressure in the damping chamber (e) assumes a value that essentially corresponds to a pressure value in the fourth partial space (f). The size of the clearance (s2) in relation to the diameter of the second piston (1*b*) is selected in such a way that, in the event of an urged movement of the valve slide from the stationary control position, the pressure in the damping chamber (e) undergoes a value change that is essentially proportional to the speed of movement of the valve slide and generates the damping force coinciding with the first force (F1) that counteracts the movement of the valve slide and thereby brings about the disturbance elimination.

The invention is not limited to the embodiments described above, but can be modified within the framework of the following patent claims and concept of the invention.

The invention claimed is:

1. A electronically-controlled damper arrangement for vehicles, the arrangement configured to reduce disturbances, the arrangement comprising:

a controller adapted to control a damper, at least one movement-detecting sensor communicating with the controller, the controlling sending control signals based upon signals received from the at least one movement-detecting sensor;

the damper comprising a cylinder, the cylinder defining an inner chamber, the inner chamber adapted to receive medium, a piston moveably positioned within the inner chamber and dividing the inner chamber into a first chamber compartment and a second chamber compartment;

the first chamber compartment and the second chamber compartment of the inner chamber of the damper communicating with a valve assembly that is adapted to control a pressure of medium in the first chamber compartment and the second chamber compartment such that damping carried out by the damper can be controlled in both directions through use of signals from the controller;

the valve assembly comprising:

an electrical coil that communicates with the controller such that the electrical coil receives control signals from the controller, an actuator moved by the electrical coil, the actuator moving in short strokes and being connected to a first piston the first piston comprising a first peripheral guide face and at least one passage extending through the piston, a spring being connected to the first piston, the first piston being located on a valve slide, the valve slide being moveable in a longitudinal direction, the valve slide being positioned within a valve housing, the valve housing comprising a first inner wall that defines a first space and a second inner wall that defines a second space, the first inner wall being generally parallel to the first peripheral guide face of the first piston, a first side opening extending through the first inner wall and a second side opening extending through the first inner wall, the first piston being positioned within the first space, the first piston dividing the first space into a first partial space and a second partial space, the second partial space being positioned between the first partial space and the second space, the at least one passage that extends through the piston connecting the first partial space to the second partial space such that axial pressure relief is provided between the first partial space and the second partial space;

the valve slide comprising a radially extending control edge and an extension part, the extension part being positioned upstream of the control edge, the valve slide extending through the first space with at least the extension part extending into the second space; the control edge being positioned generally at a transition between the first space and the second space;

a second piston being located on the valve slide, the second piston dividing the second space into a third partial space and a fourth partial space, the third partial space being positioned between the second partial space and the fourth partial space;

the valve slide comprising a first partial area defined by a surface area of the control edge and a second partial area defined by a surface area of an end surface of the second piston;

the second piston comprising a second peripheral guide face that extends generally parallel to the second inner wall, the second peripheral guide face being spaced from the second inner wall by a clearance, the clearance being adapted to effect a reduction in disturbance by bringing about changes in pressure that arise in the second space as a result of movement or pressure changes on the valve slide by using the second partial area to alter a force in a direction that counters movement of the second piston;

a first flow path extending from the first chamber compartment of the damper, through the second space and the first space, through the first side opening in the valve housing and a first duct that connects to the second chamber compartment of the damper;

a second flow path extending from the first space, through the second side opening in the valve housing and a second duct that connects to the second chamber compartment;

the first piston axially moveable between at least a first position and a second position, with the first piston in the first position, medium flows through the first flow path and, with the first piston in the second position, medium flows through the second flow path unaffected by the first piston, a non-return element being positioned within the second flow path, the first piston being radially moveable within the first space such that, when positioned in the first position, the first peripheral guide face of the first piston moves closer to the first inner wall of the valve housing adjacent to the first side opening such that a flow of medium through the first flow path is reduced, which results in increased pressure in the first space, which opens the non-return element, the first piston urged into the first position by the spring and moving toward the first side opening due to a reduced pressure resulting from movement of the first piston to the first position.

2. The arrangement of claim 1, wherein the valve slide is configured for axial movement, a first gap defined between the first piston and the first inner wall, a second gap being defined between the second piston and the second inner wall, the first gap and the second gap being generally the same size and the valve slide being capable of radial movement in the first and second gaps.

3. The arrangement of claim 1, wherein flow of medium into the second flow path when the first piston is in the second position can be calibrated with sizing of a passage.

4. The arrangement of claim 3, wherein the passage comprises a groove formed in the first piston.

5. The arrangement of claim 3, wherein the passage comprises a hole formed in the first piston.

6. The arrangement of claim 1 further comprising at least one opening through the housing into the second space, the second piston overlapping to a first degree the at least one opening through the housing into the second space when the first piston is in the first position and the second piston having a smaller degree of overlap when the first piston is in the second position such that damping is generally deactivated when the first piston is in the second position and damping is generally activated when the first piston is in the first position.

7. The arrangement of claim 1, wherein the first inner wall is formed in a first component and the second inner wall is formed in a second component, the second component being positioned within the first component.

8. The arrangement of claim 7, wherein a pilot valve is defined by the second piston and the second component and a main valve is defined by the first piston and the first component.

9. The arrangement of claim 8, wherein the main valve comprises a spring and the pilot valve is positioned within the spring.

10. A valve assembly for a damper arrangement for vehicles, the valve assembly comprising:

a first piston comprising a first peripheral guide face and at least one passage extending through the piston, the first piston being located on a valve slide, the valve slide comprising a radially extending control surface, the radially extending control surface being positioned between the first piston and an extension part, a second piston being located on the extension part of the valve slide, the second piston comprising a second peripheral guide face and an end surface that extends generally normal to the second peripheral guide face, a first partial area of the valve slide being defined by a surface area of the control surface and a second partial area defined by a surface area of the end surface of the second piston;

the valve slide being positioned within a valve housing, the valve housing comprising a first inner wall that defines a first space and a second inner wall that defines a second space, the control surface of the valve slide being positioned generally at the transition from the first space to the second space;

the first inner wall being generally parallel to the first peripheral guide face of the first piston, the second inner wall being generally parallel to the second peripheral guide face of the second piston, a first side opening extending through the first inner wall and a second side opening extending through the first inner wall;

the first piston being positioned within the first space, the first piston dividing the first space into a first partial space and a second partial space, the second partial space being positioned between the first partial space and the second space, the second piston dividing the second space into a third partial space and a fourth partial space, the third partial space being positioned between the second partial space and the fourth partial space;

the first peripheral guide face being spaced from the first inner wall by a first clearance, the second peripheral guide face begin spaced from the second inner wall by a second clearance, the second clearance being generally the same as the first clearance;

the at least one passage that extends through the piston connecting the first partial space to the second partial space a first flow path extending from the damper, through the second space and the first space, through the first side opening in the valve housing and returning to the damper;

a second flow path extending from the damper, through the second space, through the second side opening in the valve housing and returning to the damper, a non-return element being positioned along the second flow path;

the first piston axially moveable between at least a first position and a second position, with the first piston in the first position, medium flows through the first flow path and, with the first piston in the second position, medium flows through the second flow path unaffected by the first piston;

the first piston being radially moveable within the first space such that, when positioned in the first position, the first peripheral guide face of the first piston moves closer to the first inner wall of the valve housing adjacent to the first side opening.

11. The valve assembly of claim 10, wherein the first piston comprising a surface that extends generally normal to the first peripheral guide surface, the surface comprising a groove that overlaps at least one of the at least one passage extending through the first piston.

12. The valve assembly of claim 10, wherein flow of medium into the second flow path when the first piston is in the second position can be calibrated with sizing of a passage.

13. The valve assembly of claim 12, wherein the passage comprises a groove formed in the first piston.

14. The valve assembly of claim 12, wherein the passage comprises a hole formed in the first piston.

15. The valve assembly of claim 10 further comprising at least one opening through the housing into the second space, the second piston overlapping to a first degree the at least one opening through the housing into the second space when the first piston is in the first position and the second piston having a smaller degree of overlap when the first piston is in the second position.

16. The valve assembly of claim 10, wherein the first inner wall is formed in a first component and the second inner wall is formed in a second component, the second component being positioned within the first component.

17. The valve assembly of claim 16, wherein a pilot valve is defined by the second piston and the second component and a main valve is defined by the first piston and the first component.

18. The valve assembly of claim 17, wherein the main valve comprises a spring and the pilot valve is positioned within the spring.

* * * * *